No. 685,252. Patented Oct. 29, 1901.
C. J. BUGBEE.
GARMENT SUPPORTER.
(Application filed Mar. 8, 1901.)
(No Model.)
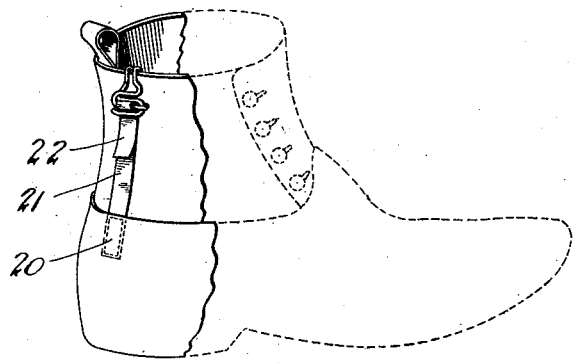
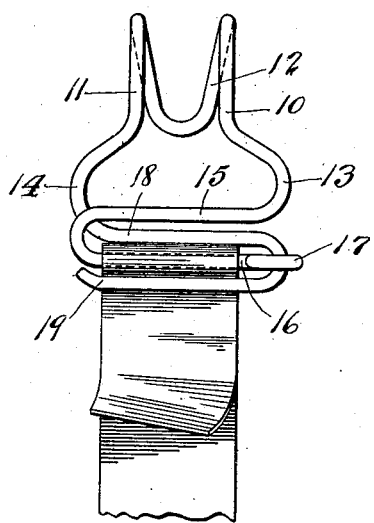
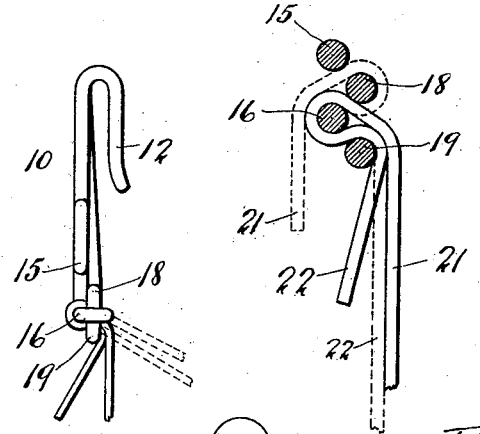
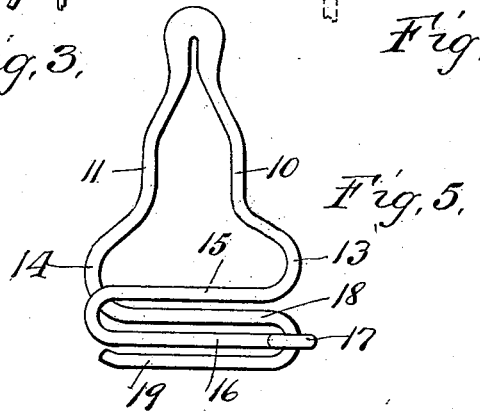
Witnesses:
Watson Hurlburt
Wm. Geiger
Inventor:
Clarence J. Bugbee
By Louis K. Gieson Atty.

UNITED STATES PATENT OFFICE.

CLARENCE J. BUGBEE, OF FULTON, ILLINOIS.

GARMENT-SUPPORTER.

SPECIFICATION forming part of Letters Patent No. 685,252, dated October 29, 1901.

Application filed March 8, 1901. Serial No. 50,371. (No model.)

*To all whom it may concern:*

Be it known that I, CLARENCE J. BUGBEE, a citizen of the United States, and a resident of Fulton, county of Whiteside, and State of Illinois, have invented certain new and useful Improvements in Garment-Supporters, of which the following is a specification, and which are illustrated in the accompanying drawings, forming a part thereof.

My invention relates to improvements in attaching and adjusting devices for garment-supporters and clasps or hooks used for similar purposes, and has for its object to provide an article of this character which shall be simple in construction and permit of a ready adjustment of the supporting tapes or bands.

The invention consists in the construction hereinafter described, and which is illustrated in the accompanying drawings, in which—

Figure 1 is a perspective of a supporting-hook for overshoes, showing the application of my invention. Fig. 2 is a rear elevation of the hook. Fig. 3 is a side elevation of the same. Fig. 4 is a section through the interlacing wires, illustrating another manner of attaching the supporting tapes or bands; and Fig. 5 illustrates the interlacing adjusting and attaching wires applied to an ordinary stocking-supporter.

The hook or clasp, as illustrated in Fig. 2, is preferably made of wire, which is bent into U shape to provide the parallel sides 10 and 11, forming the shank portion of the hook, the bottom of the U being turned back on the shank to form the bill 12. As the shank and bill of the hook are designedly made as narrow as possible to secure compactness, each of the parallel shank-wires 10 and 11 is bent or bowed outwardly, as at 13 and 14, to provide an enlargement between the same in order to adapt the tape-attaching wires to the width of the ordinary elastic tape or band. The shank-wire 10 after passing the bowed portion 13 is bent inwardly and at a right angle to the shank of the hook, as at 15, the end 16 then being turned downwardly and backwardly upon and parallel to the portion 15 and provided with a loop or eye 17. The portion 18 of the shank-wire 11 extending beyond the bowed portion 14 passes inwardly at a right angle to the shank of the hook between the parallel wires 15 and 16, then downwardly through the eye or loop 17, and backwardly upon itself and parallel to the wire 16, its end 19 being left free.

To provide for a wedge action between the wires and the tape passing around the same for more securely holding the tape, the wires 15 and 16 are bent so that they lie in a plane at the rear of the wires 18 and 19, as will be clearly seen on referring to Figs. 3 and 4. The interlacing ends of the hook or clasp provide a simple and positive securing means for the tapes or bands of garment-supporters and permit of their ready adjustment.

As illustrated in Fig. 1, the end 20 of the supporting elastic band or tape 21 is sewed or otherwise secured to the overshoe and its other end 22 passed through the space between the parallel wires 16 and 18 and then down and between the wires 16 and 19. When the overshoe is put on, the bill 12 of the hook is engaged with the top or upper part of the shoe, and the elastic being stretched the yielding of the tape is not only resisted by its frictional contact with the wire 16, which by reason of its location back of the wire 19 is disposed at a right angle to the line of pull, but also by the free end of the tape or elastic, against which the end 21 of the tape bears in passing over the wire 19. The tape is adjusted by pulling upon one end or the other at a right angle to the shank of the wire 16, as seen in dotted lines in Fig. 3.

Another way of securing the bands or tapes is illustrated in dotted lines in Fig. 4, the interlacing wires being shown in cross-section. In this instance the tape 22 is attached to the overshoe or other article to be supported and the end 21 carried over the wire 19 between the wires 19 and 16, then around the wire 16 and back between the wires 16 and 18, and finally between the wires 18 and 15. The adjustment is accomplished by slipping the free end 21 of the tape from between the wires 18 and 15, and the tape may then be moved in either direction by pulling at a right angle to the shank of the hook on the end 21 or the end 22 of the tape.

It will be obvious that the interlacing wires may be used in many situations where it is desired to adjustably support a garment or other article—as, for instance, it may be applied to stocking-supporters, such application being shown in Fig. 5.

I claim as my invention—

1. A garment-supporter, hook or clasp made of wire and comprising the shank portions, the end of one of which is provided with a loop having parallel arms and the end of the other bent to aline with the space between the arms of the loop.

2. A garment-supporter, hook or clasp made of wire and comprising the shank portions, the end of one of which is provided with a loop having parallel arms and the end of the other having a corresponding loop, the arms of which alternate with the arms of the first loop whereby a wedging action is provided between the said arms.

3. A garment-supporter, hook or clasp made of wire, consisting of the shank portions formed with a bill, the end of one of the shank portions being provided with a loop, the arms of which are parallel and extend inwardly at a right angle to the shank, the other end portion of the shank having a similar loop, the arms of which alternate with the arms of the other loop, and the said loops being located in different planes.

4. A garment-supporter, hook or clasp made of wire, consisting of the shank portions formed with a bill, the end of one of the shank portions being bent to form a loop and having an eye at its end, the other shank portion being bent to aline with the space between the parallel arms of the loop and passed through the eye, its free end extending backwardly upon itself and parallel with the arms of the loop.

CLARENCE J. BUGBEE.

Witnesses:
O. E. WOLCOTT,
LOREN B. BUGBEE.